(12) United States Patent
Guyette et al.

(10) Patent No.: US 12,477,968 B2
(45) Date of Patent: Nov. 25, 2025

(54) MACHINE CONTROL SYSTEM AND METHOD WITH ROLL-UP REPORTING

(71) Applicant: Insero LLC, Tempe, AZ (US)

(72) Inventors: Greg S. Guyette, Tempe, AZ (US); Aaron C. Stichter, Tempe, AZ (US); Shane Martin Walker, Pitt Town (AU)

(73) Assignee: Insero LLC, Tempe, AZ (US)

( * ) Notice: Subject to any disclaimer, the term of this patent is extended or adjusted under 35 U.S.C. 154(b) by 131 days.

(21) Appl. No.: 17/983,191

(22) Filed: Nov. 8, 2022

(65) Prior Publication Data

US 2023/0146942 A1   May 11, 2023

Related U.S. Application Data

(60) Provisional application No. 63/277,014, filed on Nov. 8, 2021.

(51) Int. Cl.

| | |
|---|---|
| *G06Q 10/0631* | (2023.01) |
| *A01B 69/00* | (2006.01) |
| *G05D 1/00* | (2006.01) |
| *G06Q 10/0639* | (2023.01) |
| *G06Q 30/04* | (2012.01) |
| *G06Q 50/02* | (2012.01) |
| *G07C 5/00* | (2006.01) |
| *G07C 5/08* | (2006.01) |

(52) U.S. Cl.
CPC ......... *A01B 69/004* (2013.01); *G05D 1/0219* (2013.01); *G05D 1/0274* (2013.01); *G06Q 10/063114* (2013.01); *G06Q 10/06316* (2013.01); *G06Q 10/0639* (2013.01); *G06Q 30/04* (2013.01); *G06Q 50/02* (2013.01); *G07C 5/008* (2013.01); *G07C 5/0808* (2013.01)

(58) Field of Classification Search
CPC .............. A01B 69/004; G05D 1/0219; G06Q 10/063114; G06Q 10/06316; G06Q 10/0639; G06Q 30/00; G06Q 50/02; G07C 5/008; G07C 5/0808
See application file for complete search history.

(56) References Cited

U.S. PATENT DOCUMENTS

| | | | |
|---|---|---|---|
| 2012/0101796 A1* | 4/2012 | Lindores | A01B 79/005 703/9 |
| 2018/0035605 A1* | 2/2018 | Guan | G06V 10/7715 |
| 2020/0160459 A1* | 5/2020 | Coolidge | G06Q 50/02 |
| 2020/0294401 A1* | 9/2020 | Kerecsen | G08G 1/205 |
| 2022/0046114 A1* | 2/2022 | Entelis | H04L 12/40 |

* cited by examiner

*Primary Examiner* — Kito R Robinson
*Assistant Examiner* — Roy Rhee
(74) *Attorney, Agent, or Firm* — AVEK IP, LLC

(57) ABSTRACT

A machine control system for an agricultural operation includes sensors mounted on the machine and providing output signals corresponding to machine operations. A roll-up reporting function produces reports of machine operation, and status. The system can be programmed for providing such reports a predetermined intervals, e.g., at the start of each work day. A portion control method embodying the present invention includes the steps of: providing sensors on an agricultural machine; outputting from the sensors signals corresponding to machine operations; roll-up reporting of the machine operations; and comparing the operational report to a work order for the machine.

1 Claim, 11 Drawing Sheets

US 12,477,968 B2

MACHINE CONTROL SYSTEM AND METHOD WITH ROLL-UP REPORTING

CROSS-REFERENCE TO RELATED APPLICATION

This application claims priority in U.S. Provisional Patent Application No. 63/277,014 filed Nov. 8, 2021, which is incorporated herein by reference.

BACKGROUND OF THE INVENTION

1. Field of the Invention

The present invention relates generally to machine control, and in particular to a system and method for controlling machines configured for terrestrial and aerial agricultural operations, including a roll-up reporting function.

2. Description of the Related Art

Agricultural operations commonly involve special-purpose equipment and machines in various phases of crop growing cycles. For example, vehicles and implements are utilized in cultivating, planting, and harvesting. Productive agricultural operations commonly apply chemical inputs for optimizing crop yields. Such chemical inputs can include fertilizers, herbicides, and pesticides. Such chemical inputs can be applied via ground-based, terrestrial vehicles, and with aircraft, i.e., crop dusters.

Machine control in agricultural operations is commonly accomplished with work orders, which can be generated remotely and transmitted to machines in the field. Reports of agricultural operations commonly include detailed information on the chemical input quantities, specific application locations, ambient conditions, and other relevant data. Data for generating such reports can be provided by machine sensors and microprocessor-based controllers analyzing raw data for generating reports. Reports can be used for work order performance monitoring, customer billing, regulatory compliance, and other purposes. Roll-up reporting with the present invention enables operators to receive summary data and analyses in real time for instant availability or assembly for queries in various time spans.

Heretofore there has not been available a system or method for machine control with the advantages and features of the present invention.

SUMMARY OF THE INVENTION

A machine control system is configured for controlling, monitoring, and reporting the operations of terrestrial and aerial agricultural equipment assets. Onboard sensors provide output signals to a programmable controller, which controls navigation, positioning, and operations of the machine. The machine control system and method of the present invention can utilize commonly available smart devices, such as iPad® devices for system interface with systems such as the: AgOtter® rate control and calibration device for ground rigs and sprayers; and the AgHippo® monitoring and live tracking online system, both of which are available from Insero, LLC, 3928 S. Dorsey Lane, Tempe, AZ 85282.

Machine operations can be reported at predetermined intervals with a roll-up reporting function, enabling operators to monitor progress and generate work orders for one or more terrestrial or aerial agricultural equipment assets. A method of machine control utilizes smart devices with automated machine functions, including navigation along predetermined guide paths through crop fields. The control method can be programmed to respond to various conditions, including crop and field conditions, for optimizing the efficiency and profitability of agricultural operations.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right, and left refer to the invention as orientated in the view being referred to. The words "inwardly" and "outwardly" refer to directions toward and away from, respectively, the geometric center of the aspect being described and designated parts thereof. Additionally, anatomical terms are given their usual meanings. For example, proximal means closer to the trunk of the body, and distal means further from the trunk of the body. Said terminology will include the words specifically mentioned, derivatives thereof, and words of similar meaning.

II. Machine Control System in Tractor-Implement Equipment 10

Figure 1:
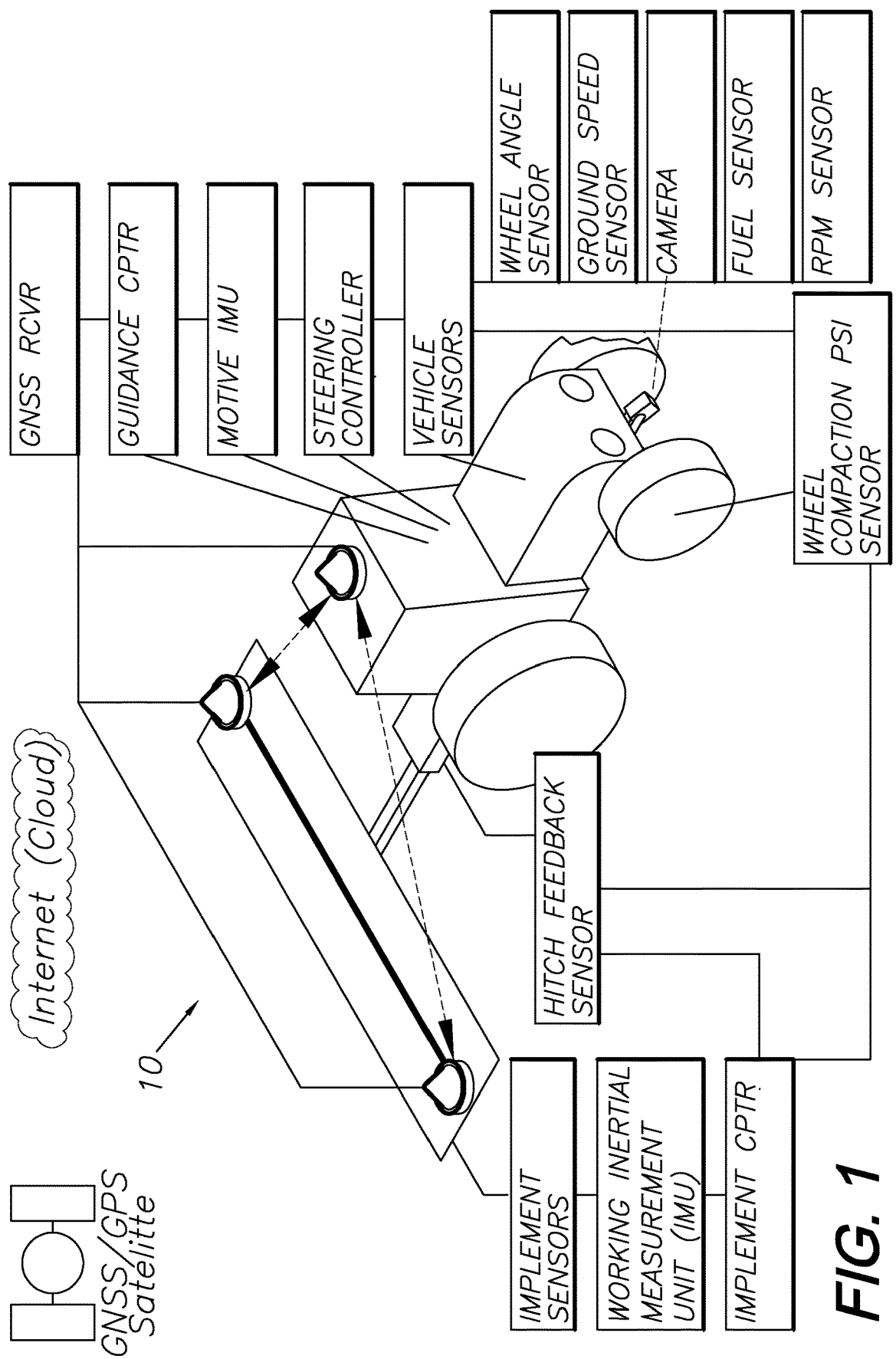
FIG. 1 is a schematic, perspective view of an application of the present invention in an agricultural operation, e.g., tracking and reporting the operation of a tractor towing an implement.

FIG. 1 shows a preferred embodiment of the control system of the present invention, shown in an application comprising a tractor-implement combination 10. Without limitation on the generality of useful agricultural applications of the control system of the present invention, the machine control system and method of the present invention can be applied in crop duster A/C (e.g., machine control system in crop duster A/C 20 described below), sprayers, combines and other agricultural equipment.

In agricultural operations, such equipment pieces are considered assets. The present invention optimizes their efficient usage and can contribute to the bottom-line profitability. Agricultural operation expenses include labor and the cost of input materials, such as seed, fertilizer, nutrients, pesticides, herbicides, and fuel.

Another objective of the control system of the present invention is efficient guidance and precise application of inputs. Guidance and positioning can utilize global navigation satellite system (GNSS) components. GNSS systems utilize satellite constellations for determining vehicle positions with triangulation. Radio frequency (RF) signals from at least four satellites are necessary, with distance-ranging signals from three satellites and timing signals from a fourth satellite providing timing signals. Current GNSS technology enables sub-centimeter positioning with commercially available components.

The global positioning system (GPS), which is currently operated and maintained by the United States Air Force, was the first GNSS system. Other GNSS systems are operated by other countries.

As shown in FIG. 1, the tractor-implement asset includes automated guidance for relatively precise positioning with GNSS signals. Various sensor systems are provided for monitoring relative positioning between the tow vehicle (e.g., tractor) and the implement (e.g., sprayer, cultivator, harvester, etc.). A transceiver receives guidance and control signals, and provides output reporting asset operation, including material dispensing rates, quantities and precise locations.

Another important function of the tractor-implement control system is reporting operations, e.g., to a centralized asset management operation or to the cloud for Internet accessibility. Personal telecommunications devices, such as iPad® mobile devices, can be used by an operator for interconnectivity with the on-board computer and the cloud. An equipment operator can use his or her iPad® device on the equipment for interfacing with the various on-board sensors, GNSS receivers, and accessing the Internet via the cloud. Work orders can be transmitted to the operators for assigning operational tasks. Task completion status reports can automatically be generated and reported to management. For example, daily reports can be transmitted before the beginning of each workday, and used to provide updated work orders.

Asset management can also be expeditiously handled by reporting operational status, repair and maintenance requirements and matching inputs to jobs. Accounting functions include reporting expenditures for equipment maintenance and repair, labor costs and other inputs. The system can provide the necessary data for invoicing customers for agricultural services. Profit and loss reports can be generated using such information, as well as commodity crop pricing information.

III. A/C Control System Alternative Embodiment 20

Figure 2:
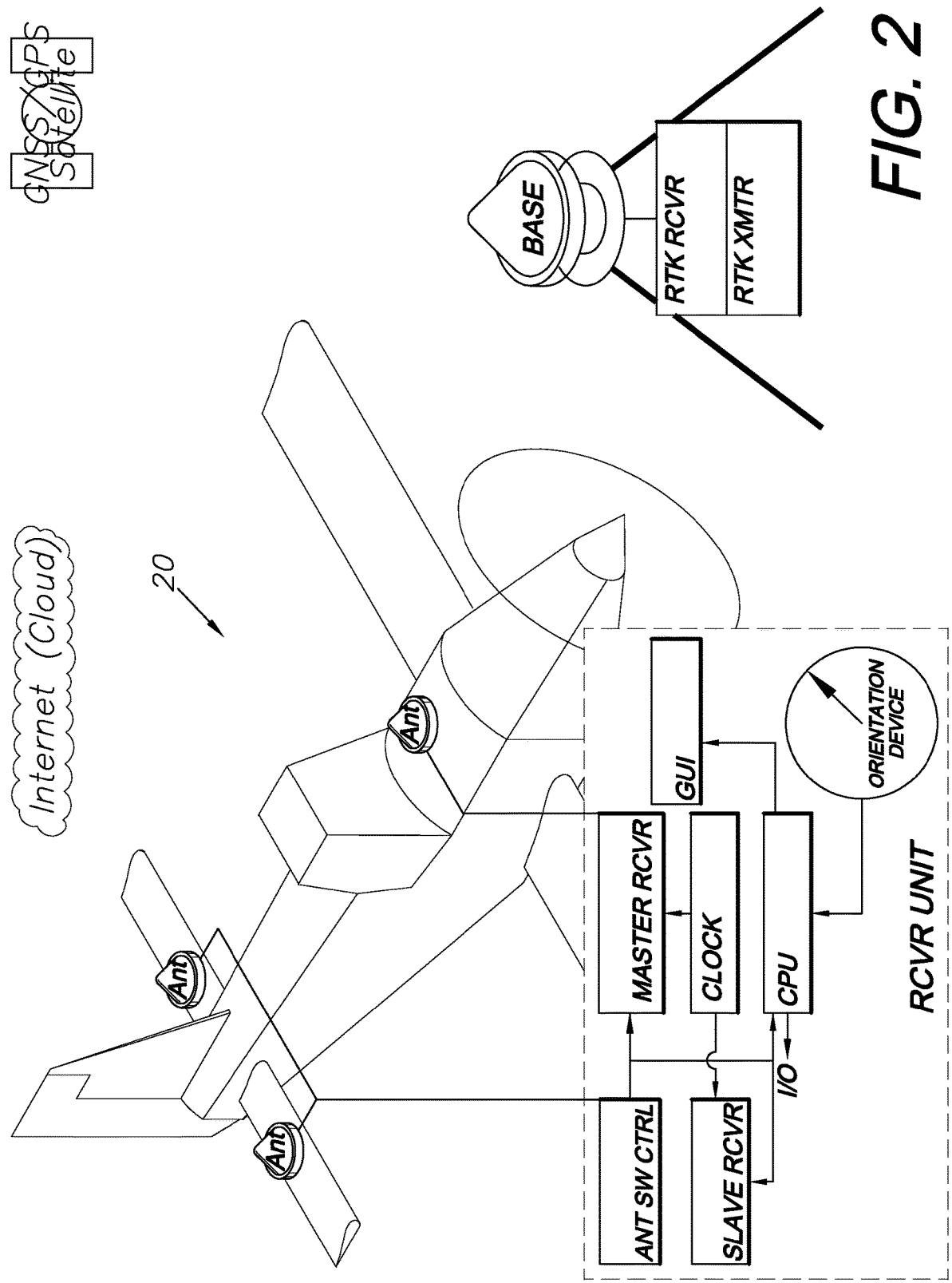
FIG. 2 is a schematic, perspective view of another application of the present invention in an aircraft (A/C) configured for crop dusting.
Figure 3:
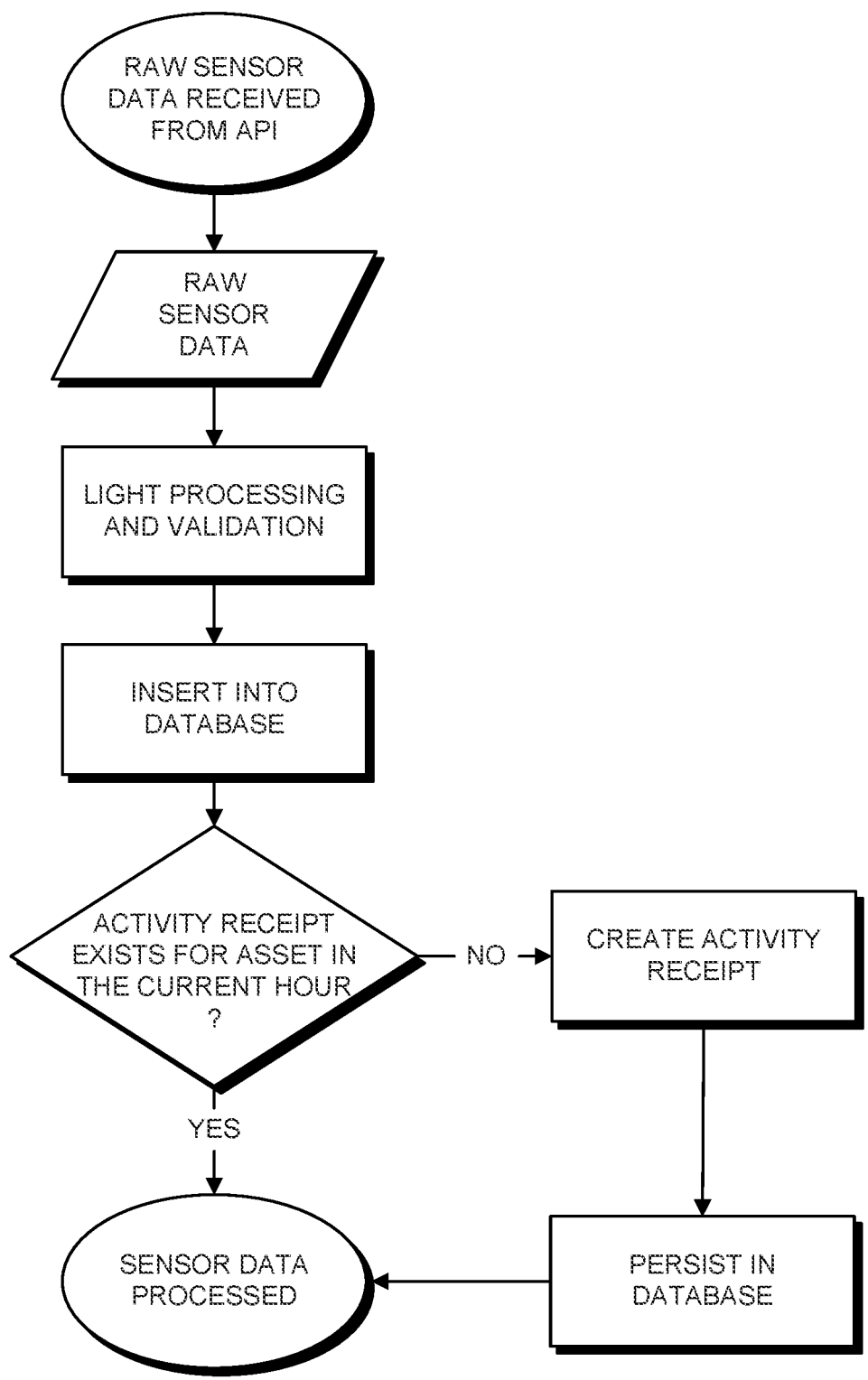
FIG. 3 is a flow diagram of sensor data handling and validation functions.
Figure 4:
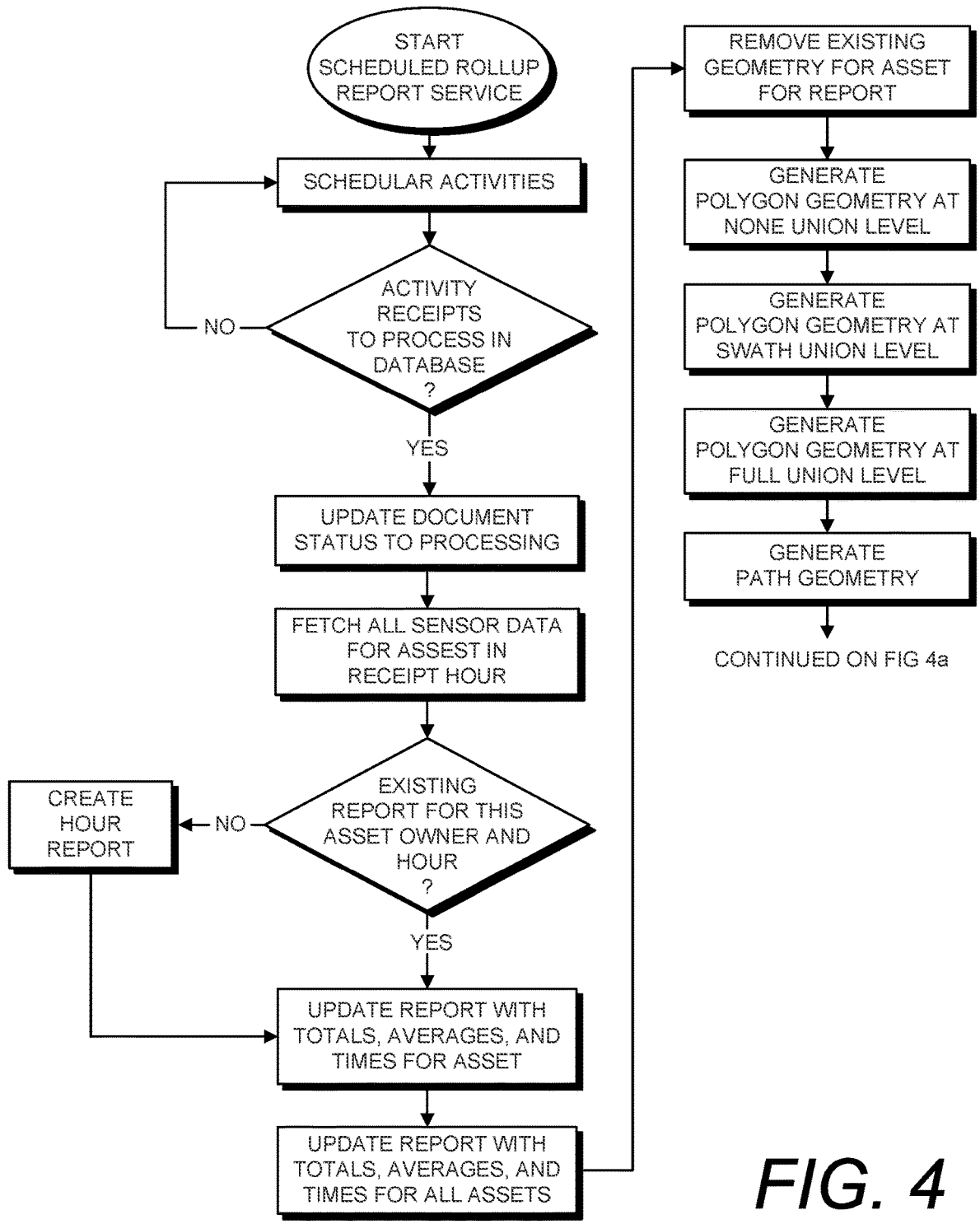
FIGS. 4-4e show a flow diagram of an asset tracking and reporting method embodying an aspect of the present invention.
Figure 4A:
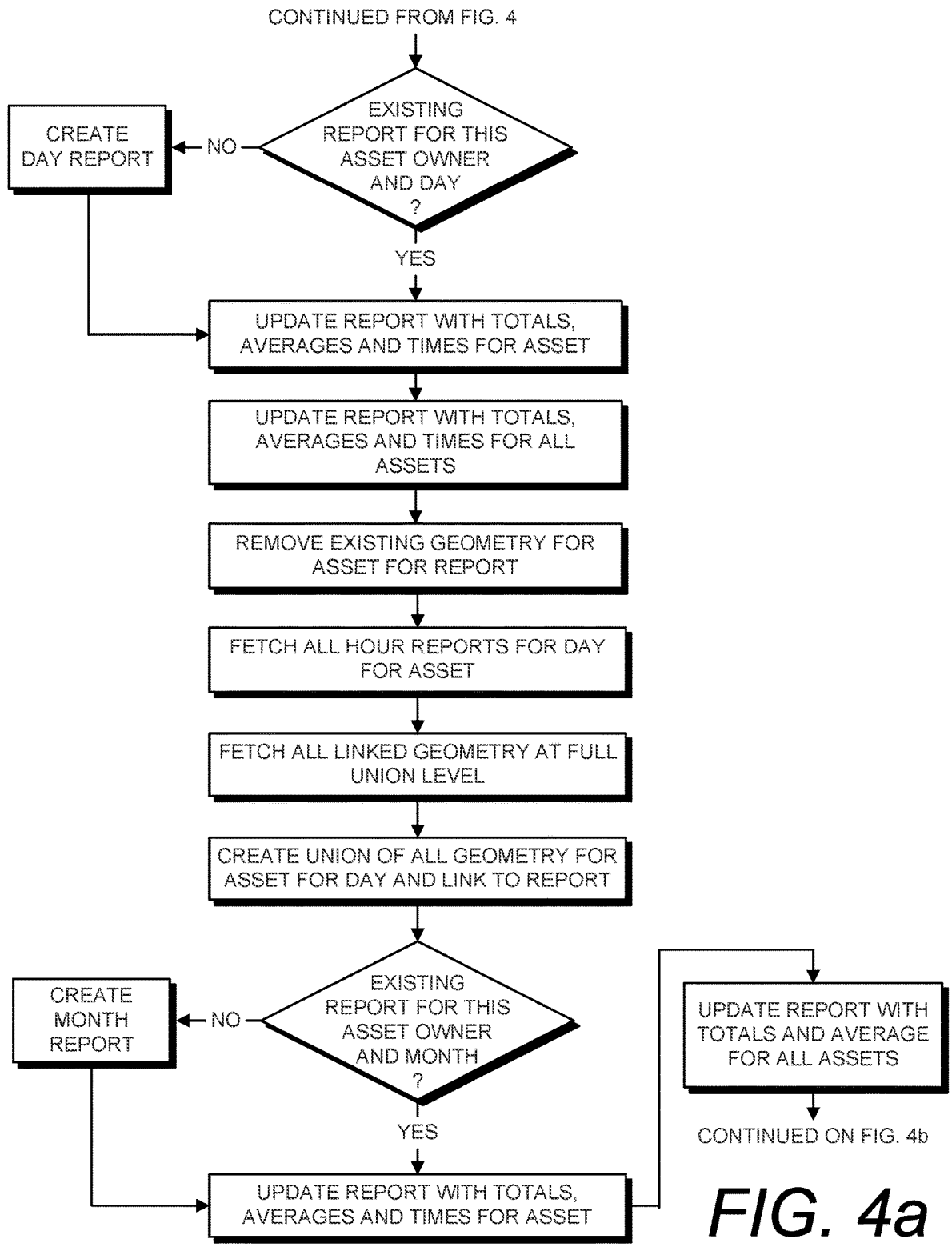
Figure 4B:
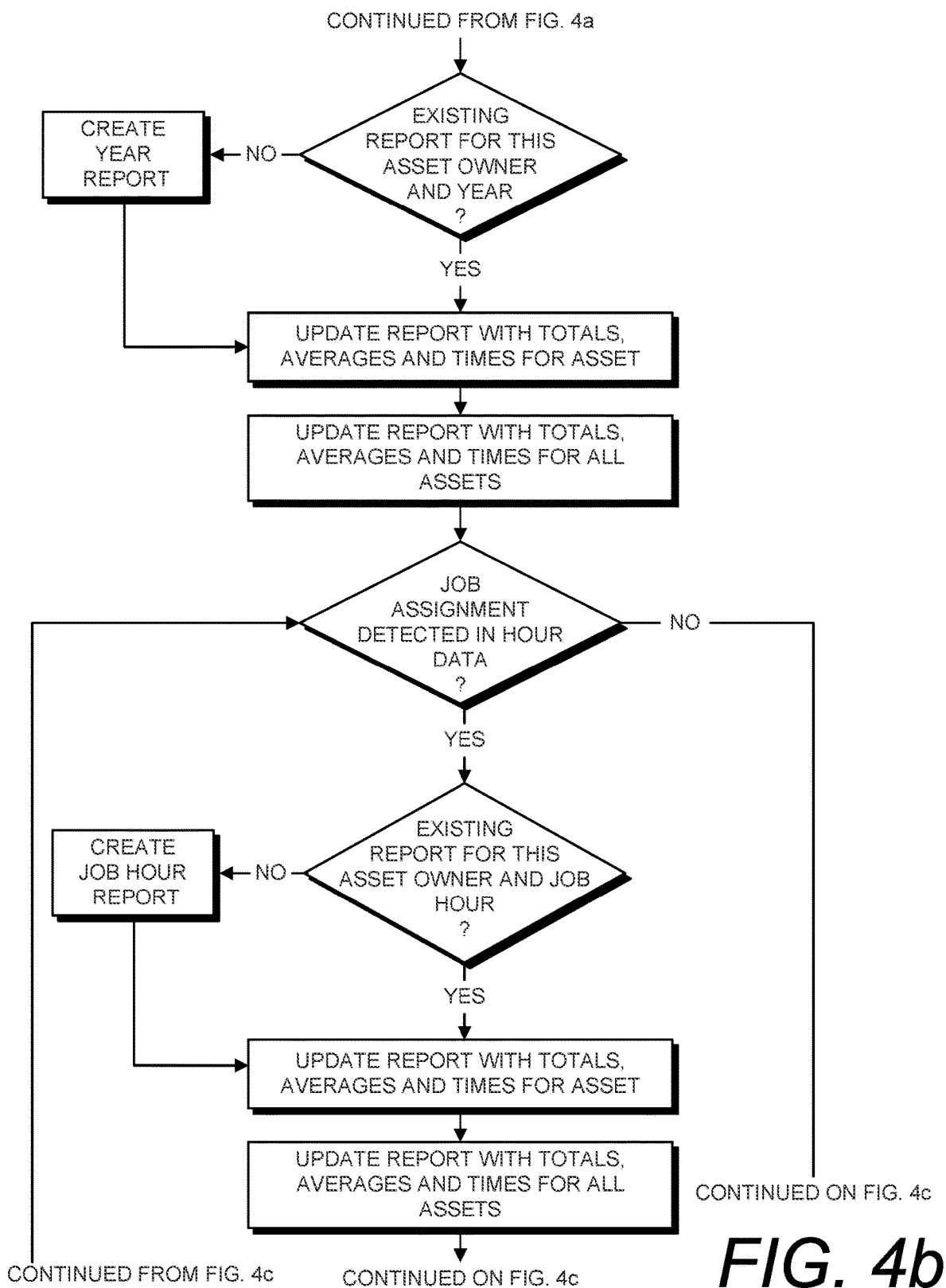
Figure 4C:
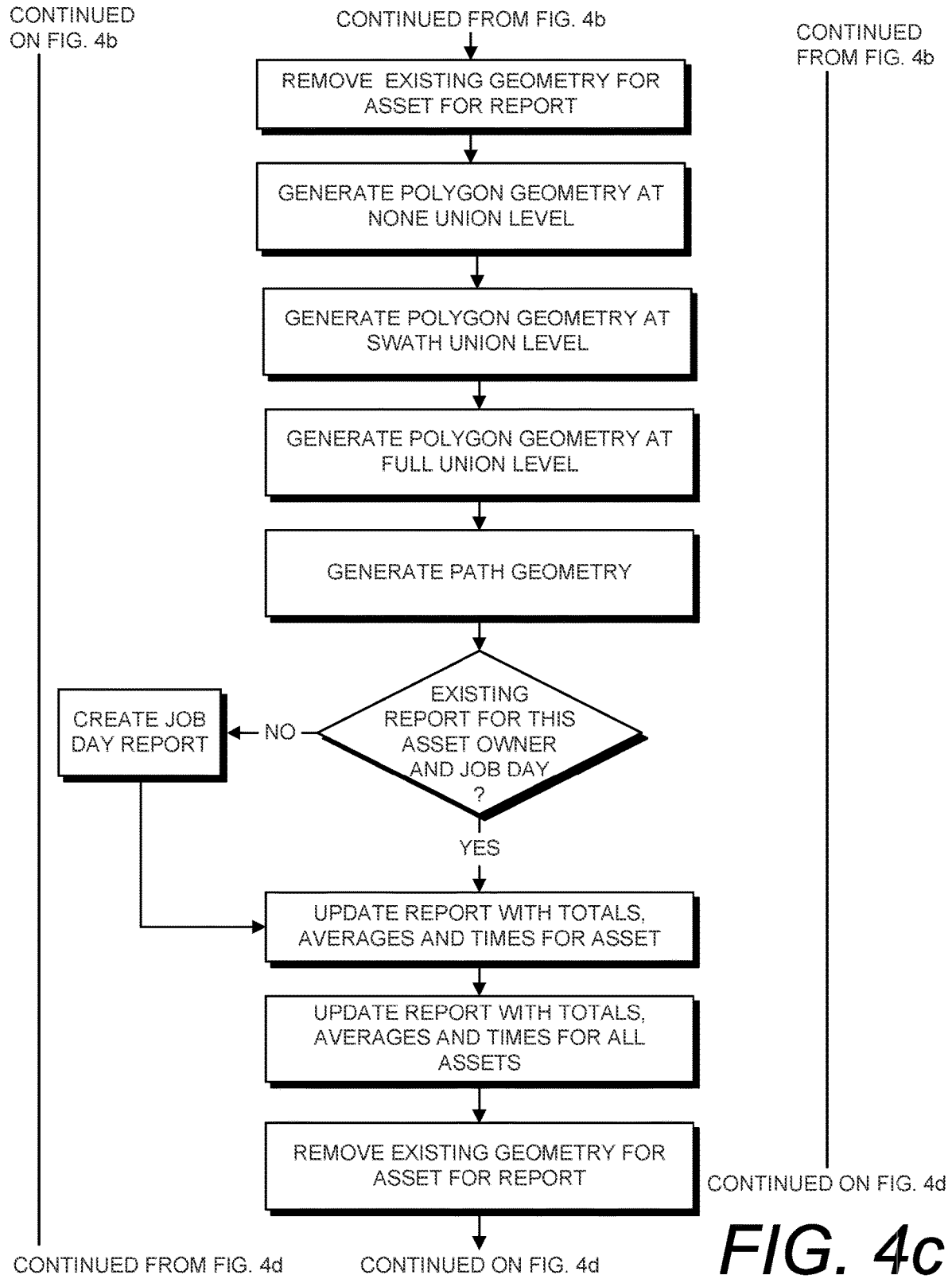
Figure 4D:
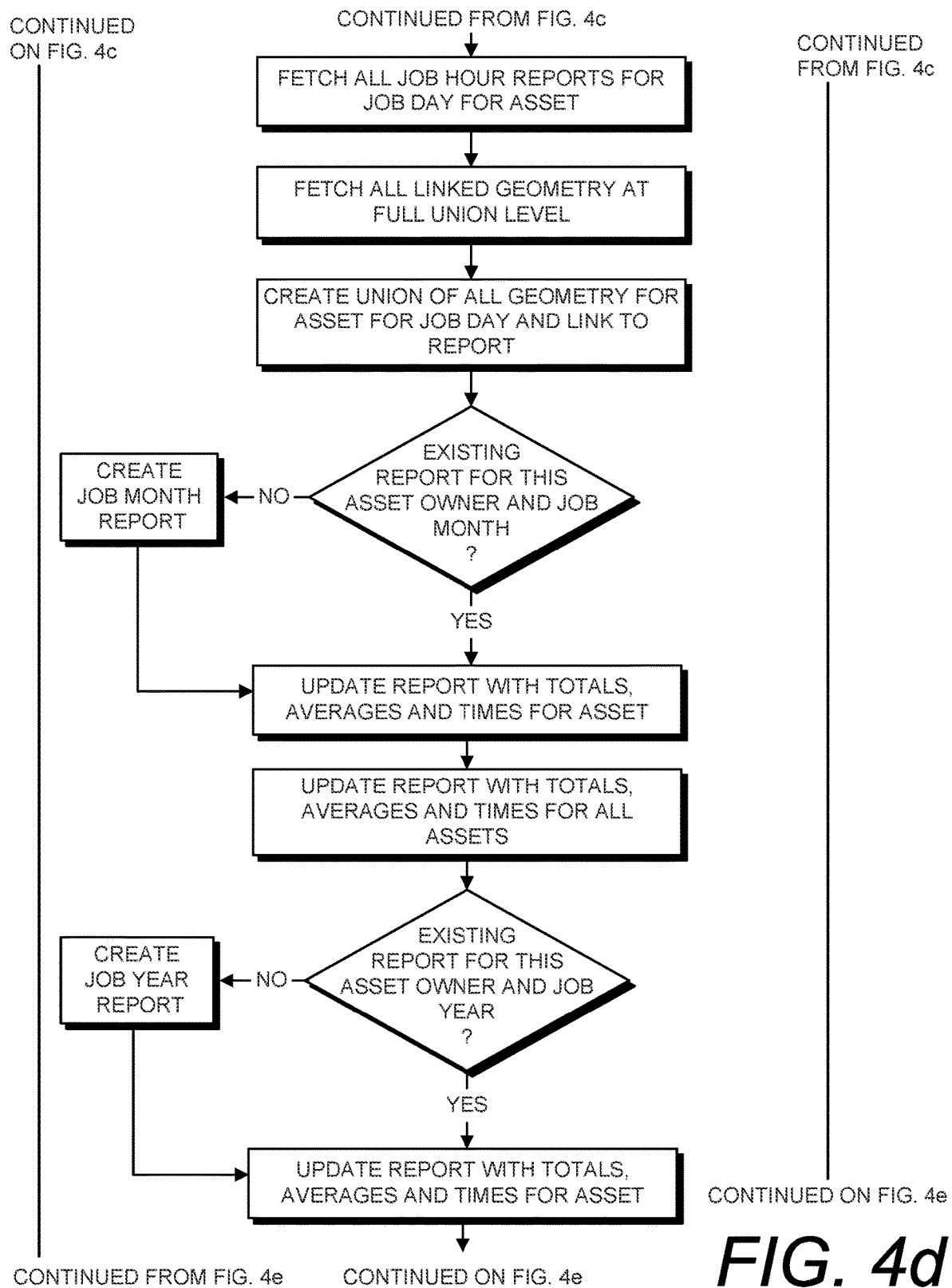
Figure 4E:
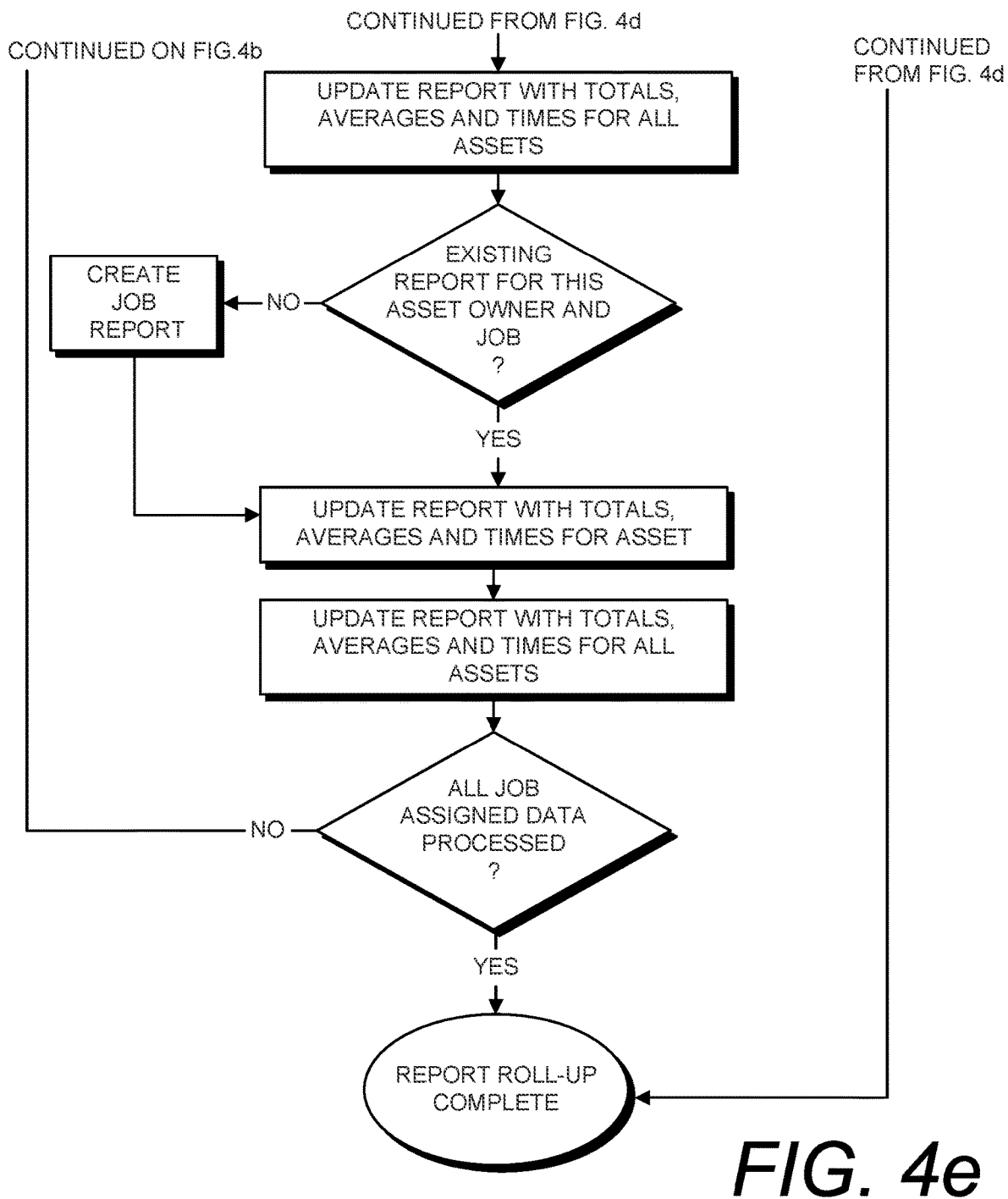
Figure 5:
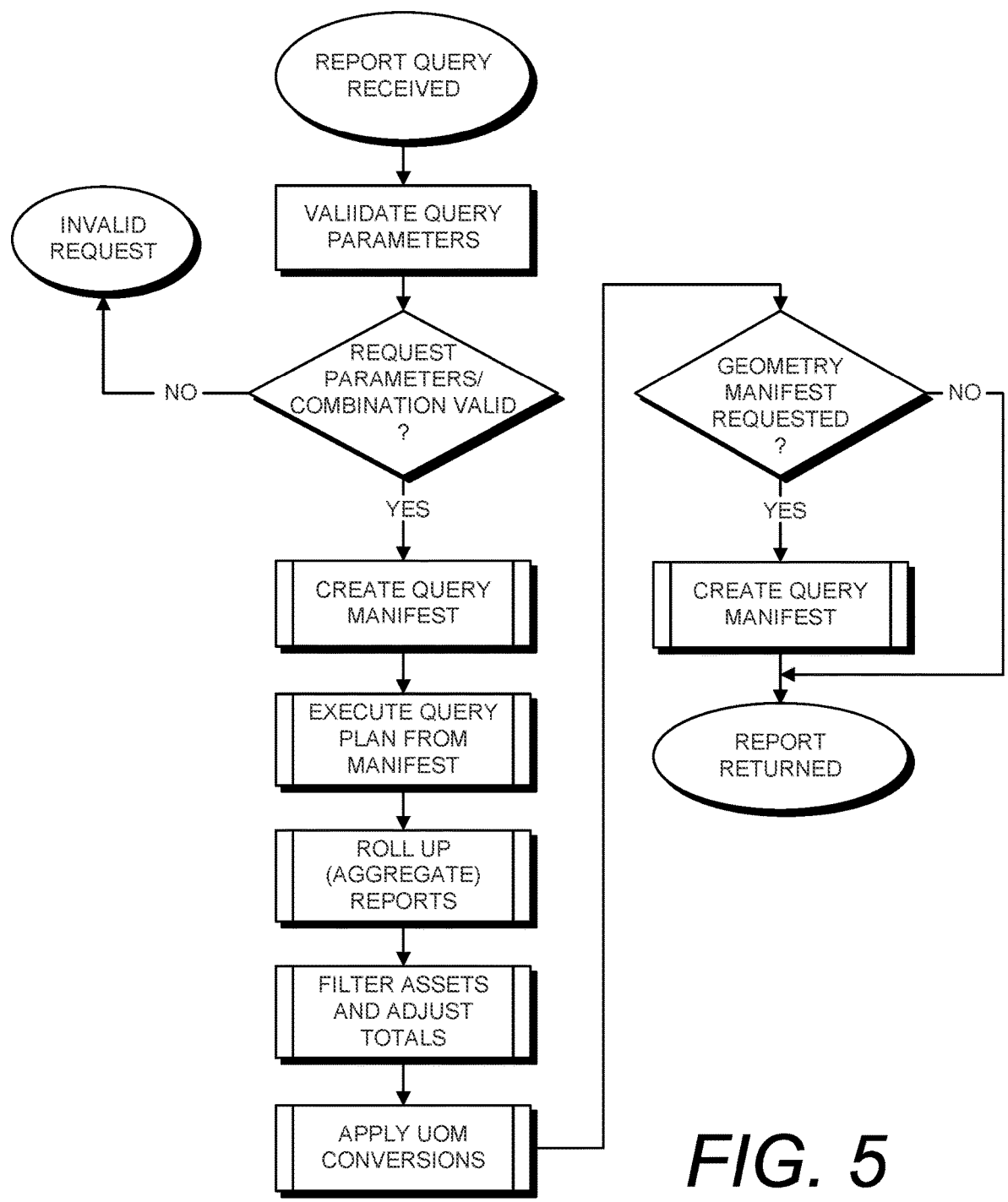
FIG. 5 is a flow diagram of reporting functions of the method of the present invention.
Figure 6:
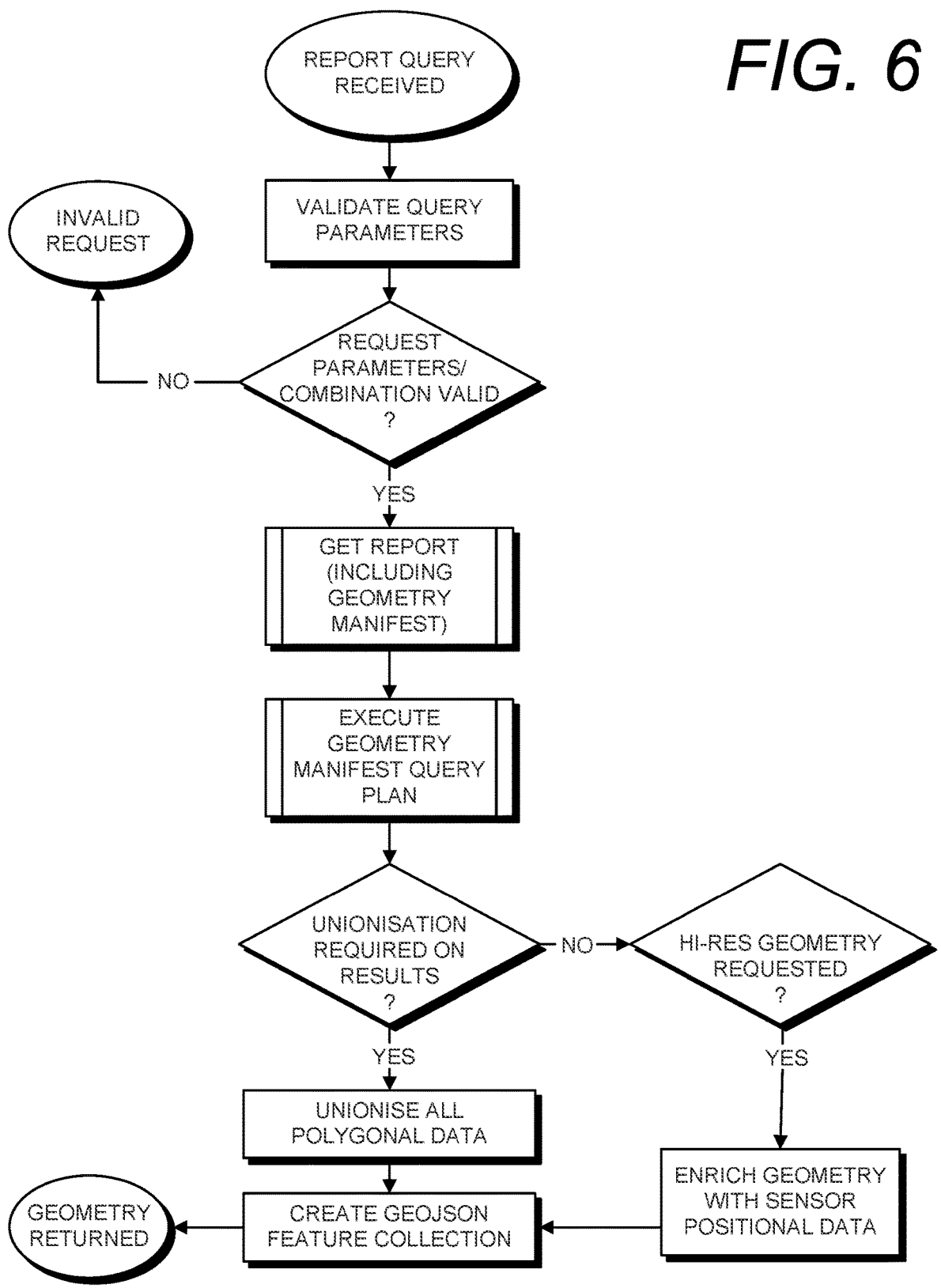
FIG. 6 is another flow diagram of reporting functions of the method of the present invention.

A first modified or alternative embodiment of the present invention is shown in FIG. 2 and comprises a control system for an aircraft (A/C). Without limitation, the A/C can be configured as a crop duster. As with the tractor-implement control system 10 described above and shown in FIG. 1, the A/C application embodiment of the present invention accommodates precision guidance and dynamic material application. Asset management, work order assignments and functions are also similar.

As used herein, A/C assets include fixed-wing aircraft, helicopters and drones. Effective guidance and positioning in A/C applications utilize 3-axis control. Data inputs include altitude, wind speed and direction, and other aviation-specific data.

IV. System-Function Summary

In practicing the machine control with roll-up reporting method of the present invention, as a non-limiting example, the operational sequence can proceed as follows:
1. Work orders are sent to machines in the field from other remote, mobile devices, or from a remote office.
2. iPad® and other smart devices can provide a system interface between an AgOtter® system in the field and an AgHippo® system online.
3. A Bluetooth® Low Energy (BLE) communication interface makes connection of an iPad® device and AgOtter® systems easy and wireless.
4. Machine's sensor and calculation data can be posted to an AgHippo® system online.
5. Summary data and analysis is rolled up in varying time chunks: e.g., hourly, daily, weekly, monthly, yearly.
6. Optimally-sized roll up reporting.
7. Rolled up results are instantly available and assembled for a query of any timespan.
8. Results are presented as visual reports on an AgHippo® system.
9. Results are transmitted to other software via an application programming interface (API).
10. Adaptable for aerial and terrestrial agricultural applications.
11. Avoids requiring modems in the equipment sensor controllers.

The following functional description is a non-limiting example of the present machine control invention, which can be embodied with other functional features, method steps and data characteristics.
1. Raw measurement data is stored in its smallest, whole, individual elements.
2. Raw data includes a time property of the measurement collection time.
3. Summary and statistical analysis is calculated for a selected group of the data.
4. Final calculations are presented to the user in the form of a report.
5. Final calculations are presented to other software in the form of an application programming interface (API).
6. Instead of bundling the selected group of data and making final calculations on demand at the time of the user query, this is performed on a regular interval, e.g., at 15-minute intervals.
7. Reports are run for buckets of data for hourly, daily, weekly, monthly and annual reports.
8. Reports are quickly, intelligently assembled for any timespan query.
9. Reports are presented on the website.
10. Reports are accessible via an API.

Advantages and Objectives

1. Maximizing speed of report generation.
2. Maximizing efficiency.

3. Instantaneous (real-time) Work Order progress-status reporting.
4. Detailed sensor data for each second of field work.
5. Errors and mistakes in the field are sent as alerts to the remote manager.
6. Faster billing cycle turnaround for optimizing cash flow.
7. Comprehensive documentation with prepackaged reports.
8. Adaptability for customer-specific reporting requirements.
9. Connectivity accommodating various equipment.
10. Tracking for all assets, equipment, and personnel.

FIGS. 3, 4-4e, 5 and 6 are flowcharts showing the steps of the Machine Control Method with Roll-up Reporting of the present invention.

V. Conclusion

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A method for controlling and roll-up reporting the operation of a machine configured for agricultural operations, which method comprises the steps of:
   providing said machine configured for said agricultural operations;
   providing said machine with a programmable controller device;
   providing said machine with multiple sensors configured for outputting raw sensor data to said controller device via an application programming interface (API);
   said sensors including: a global navigation satellite system (GNSS) with a receiver configured for receiving positioning signals from multiple satellites and providing GNSS-defined positional data;
   said raw sensor data output by said sensors comprising: GNSS-defined positional data; and machine operational data including groundspeed, orientation, material dispensing rate and quantities and precise locations of material discharged by said machine;
   providing said machine with a personal telecommunications device configured for transmitting and receiving signals corresponding to GNSS-defined positions and agricultural operations of said machine using said operational data;
   connecting said controller device to said personal telecommunications device;
   programming said controller device to generate periodic reports of said agricultural operations;
   transmitting said periodic reports using said personal telecommunications device;
   transmitting work order tasks including agricultural operation tasks to said controller device;
   reporting with said controller device status of said work order tasks;
   configuring said controller device with a low energy communication interface for use by an operator;
   interfacing with a rate control and calibration device configured for installation on said machine and receiving data from said machine sensors;
   configuring said rate control and calibration device for tracking operator activity; inputting an application by field area and alerting remote asset managers to errors in said work order tasks;
   generating billing records based on work order task completions;
   customizing report frequency and content based on customer-specific reporting requirements;
   mapping an agricultural field as a polygon and generating a guide path for said machine for coverage of said agricultural field;
   receiving with said controller device queries based on at least one of time, job/work order and asset identifiers for agricultural tasks, validating query parameters based on pre-generated criteria and reporting field geometry manifest plans consisting of asset positional data and sensor-derived data including asset speed, volume of product applied and geographical area covered; and
   customizing work orders and reports using customer-specified units of measurement (UOM) including pre-generated roll-up reports.

* * * * *